J. R. MORGAN.
CHAIN FASTENER.
APPLICATION FILED MAY 20, 1916.
1,264,676.
Patented Apr. 30, 1918.
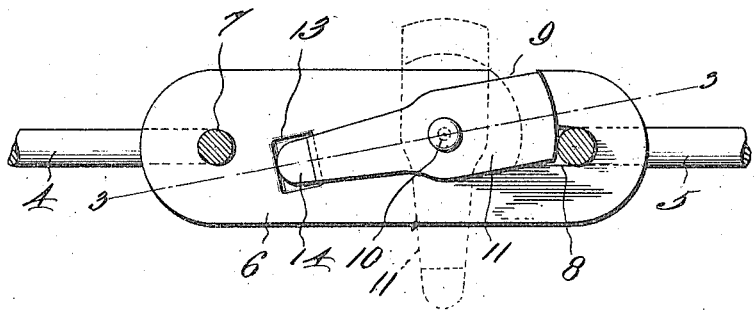
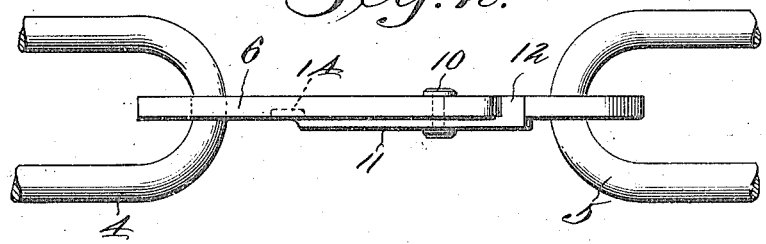
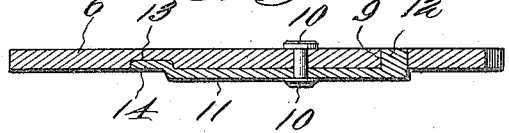
INVENTOR
James R. Morgan,
BY
ATTORNEY
WITNESSES

UNITED STATES PATENT OFFICE.

JAMES R. MORGAN, OF WILCOX, WASHINGTON.

CHAIN-FASTENER.

1,264,676.

Specification of Letters Patent.   Patented Apr. 30, 1918.

Application filed May 20, 1916. Serial No. 98,895.

*To all whom it may concern:*

Be it known that I, JAMES R. MORGAN, a citizen of the United States, residing at Wilcox, in the county of Whitman and State of Washington, have invented certain new and useful Improvements in Chain-Fasteners, of which the following is a specification:

This invention relates to chain end connecting means, and has for its primary object to provide a simplified and improved chain end connector, which is of extremely inexpensive construction, which is composed of but few readily assembled and durable parts, all so constructed and arranged as to prevent wear, breakage, or derangement of the same, which is easy and positive in operation, and which may be readily actuated when desired to disconnect the chain ends.

A further and particular object of the invention is to provide a connector of this character which is proof against accidental opening.

A still further object of the invention is to provide a connector for use particularly in connection with chains for pneumatic tires, and which is so constructed as to preclude wear, abrasion, or puncturing of the inflated member.

With these objects in view, together with others, which will appear as the description proceeds, the invention resides in the novel formation, combination and arrangement of parts, all as will be described more fully hereinafter, illustrated in the drawings, and particularly pointed out in the claim. The invention will be best understood by reference to the accompanying drawings, wherein:—

Figure 1 is a sectional view through adjacent chain ends, and illustrating in elevation the application thereto of a connector constructed in accordance with my invention;

Fig. 2 is a top plan view of the device shown in Fig. 1; and

Fig. 3 is a sectional view taken upon line 3—3 of Fig. 1.

Referring now more particularly to the drawing, 4 and 5 indicate the spaced chain ends. The connector for detachably connecting the chain ends comprises a link or plate 6, formed of a relatively short narrow and thin metallic bar. One end of the bar or plate is provided with an aperture 7, through which the end link 4 of the chain is permanently secured. An elongated slot 8 extends for a short distance longitudinally of the plate 6 remote from the aperture 7, and is of a width sufficient to accommodate the link 5 of the opposing chain. An arcuate slot 9 communicates with the innermost extremity of the slot 8, the said arcuate slot extending to one of the lateral edges of the plate 6. This arcuate slot is of a width equal to that of the slot 8.

Pivoted upon one side of the plate by a pin 10 arranged concentric with the arcuate slot 9, is a locking lever 11. This lever is provided at one extremity with a stud or projection 12, projecting from the inner face of the lever 11, a distance equal to the thickness of the plate 6, and the said stud is so arranged as to slide within the arcuate slot 9, when the lever 11 is rocked upon its pivot. The distance between the stud end of the lever 11 and the extreme outermost end of the elongated slot 8 is equal to the thickness of the chain link 5, and it is apparent that upon the insertion of a link within the said slot, and rocking of the lever inwardly upon the plate, the link will be firmly bound and held within the said slot. The stud or projection 12 is preferably co-extensive with the width of the lever, whereby a filler portion for the arcuate slot 9 is provided. Upon rocking the lever 11 outwardly, it is apparent that the chain link 5 may be readily disengaged from the slot 8.

To hold the lever 11 firmly in locking position, a socket 13 is formed in the outer face of the plate 6 adjacent the innermost end of the lever, and within which an offset portion 14 on the said lever end is adapted to seat. The socket or depression 13 is so arranged upon the plate 6 that when the offset portion 14 is engaged therein, the lever will be in locked position.

With reference particularly to Figs. 2 and 3, of the drawing, it will be observed that the inner face of the plate 6 presents no projections, excepting the rounded pivot pin 10, which will engage with and tear or abrade a tire with which the device may be used. It will be further observed that once the lever 11 is swung to locking position and the offset 14 thereon engaged in the plate socket, accidental disengagement of the link 5 will be positively prevented.

Rearward pressure upon the link 5 will in no way tend to rock the lever 11, but will only bind the lever upon its pivot 10, and the projection or stud 12 upon the arcuate edge of the slot 9. The lever 11 may be readily rocked upon its pivot to unlocking position upon the application of pressure thereto, upon either side of the pin 10.

While the above is a description of the preferred embodiment of the invention, it is very obvious that various changes or alterations in the shape, size, or formation of the device may be resorted to, if deemed necessary or expedient without departing from the spirit of the invention or exceeding the scope of the claim.

What is claimed is:—

The combination with chain ends; of a plate pivoted at one end and intermediate its side edges to one of said chain ends, the opposite end of said plate having a longitudinal slot alined longitudinally with said pivot point, a lever pivoted intermediate its ends to said plate and the pivotal point of the same being substantially longitudinally alined with said slot and pivot point of said chain, the said plate having an arcuate slot establishing communication between said longitudinal slot and one edge of said plate, a lug carried by one end of said lever and being adapted to travel in said arcuate slot, and to entirely occupy the same, the said lug being adapted to close the inner end of said longitudinal slot and to form an abutment for the link therein and to hold the link against movement, and means for locking said lever against movement.

In testimony whereof I affix my signature in presence of two witnesses.

JAMES R. MORGAN.

Witnesses:
  HARMON A. CONN,
  EDMUND B. THOMPSON.

Copies of this patent may be obtained for five cents each, by addressing the "Commissioner of Patents, Washington, D. C."